(12) United States Patent
Kawasaki et al.

(10) Patent No.: US 6,212,005 B1
(45) Date of Patent: Apr. 3, 2001

(54) MICROSCOPE ILLUMINATION OPTICAL SYSTEM AND MICROSCOPE HAVING THE SAME

(75) Inventors: Kenji Kawasaki; Kazuo Kajitani, both of Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/245,313

(22) Filed: Feb. 5, 1999

(30) Foreign Application Priority Data

Feb. 6, 1998 (JP) .................................................. 10-025619

(51) Int. Cl.[7] ............................. G02B 21/06; G02B 21/00
(52) U.S. Cl. ............................. 359/388; 359/368; 359/385
(58) Field of Search ............................. 359/368–390, 359/599, 707

(56) References Cited

U.S. PATENT DOCUMENTS

| 4,063,797 | * | 12/1977 | Taira | 359/385 |
| 4,397,529 | * | 8/1983 | Taira | 359/388 |
| 5,684,625 | * | 11/1997 | Stankewitz et al. | 359/385 |
| 5,880,861 | * | 3/1999 | Nishida | 359/385 |

FOREIGN PATENT DOCUMENTS

| 2-16517 | * | 1/1990 | (JP) | 359/385 |
| 9-33820 | | 2/1997 | (JP) . | |

* cited by examiner

Primary Examiner—Thong Nguyen
(74) Attorney, Agent, or Firm—Pillsbury Winthrop LLP

(57) ABSTRACT

A microscope illumination optical system for an ultra-low magnification wherein the roughness of a light diffusing plate is not visible, and uniform illumination can be performed, and wherein specimens of weak contrast, a phase distribution, etc. can be made visible through adjustment of the numerical aperture by varying the aperture of an aperture stop. A collector lens system forms a first image of a light source. A first variable stop is placed at the first image position. An intermediate lens system has a second variable stop therein and forms an image of the first variable stop behind the system. A plurality of condenser lens systems of different magnifications are interchangeably placed between the intermediate lens system and a specimen plane. A condenser lens system having the smallest magnification is arranged such that an image of the second variable stop is formed at a finite position in the space of the specimen plane, and a position conjugate to the specimen plane is located closer to the light source than the first variable stop.

6 Claims, 5 Drawing Sheets

MICROSCOPE ILLUMINATION OPTICAL SYSTEM AND MICROSCOPE HAVING THE SAME

BACKGROUND OF THE INVENTION

1. Field of the Invention

The present invention relates to a microscope illumination optical system and a microscope having illumination optical system. More particularly, the present invention relates to a microscope illumination optical system capable of varying the visual field and the numerical aperture according to the magnification of a microscope objective.

2. Description of Related Art

Japanese Patent Application Unexamined Publication (KOKAI) No. 9-33820 proposes a conventional microscope illumination optical system in which three condenser lenses having different focal lengths are prepared, a condenser lens for a high magnification, a condenser lens for a low magnification, and a condenser lens for an ultra-low magnification. The three Condenser lenses perform appropriate illumination according to the magnification of a microscope objective, by switching the condenser lenses from one to another, according to the magnification of the microscope objective.

FIGS. 5(a) and 5(b) are ray path diagrams illustrating the conventional microscope illumination optical system. FIG. 5(a) shows the arrangement of the illumination optical system in the case of a high or low magnification. FIG. 5(b) shows the arrangement of the illumination optical system in the case of an ultra-low magnification. When the illumination optical system is in the position shown in FIG. 5(a), light from a light source 1 passes through a first collector lens unit L1 and a second collector lens unit L2. The two collector lens units L1 and L2 form a first image of the light source 1. A first variable stop A is placed at the position of the first image. A light beam passing through the first variable stop A passes through a first intermediate lens unit L3, a second variable stop F and a second intermediate lens unit L4. The two intermediate lens units L3 and L4 form a second image of the light source 1. Accordingly, the position of the image plane of the second image is conjugate to the first variable stop A with respect to the two intermediate lens units L3 and L4. The second variable stop F is placed at the front focal point of the second intermediate lens unit L4. A condenser lens unit LC1 for a high or low magnification is placed behind the second intermediate lens unit L4 to lead a light beam from the second image of the light source 1 to a specimen plane 2 in the form of collimated light. The specimen plane 2 is conjugate to the second variable stop F with respect to the second intermediate lens unit L4 and the condenser lens unit LC1 for a high or low magnification.

Accordingly, when the illumination optical system is in the position for a high or low magnification (from 4× to 100× magnification) as shown in FIG. 5(a), the first variable stop A is an aperture stop, and the second variable stop F is a field stop. The back focal point of a high- or low-magnification objective Ob1 of a microscope is conjugate to the first variable stop A and the light source 1. The whole illumination optical system acts as a Koehler illumination system. A specimen is placed in the specimen plane 2, which is well defined, bright and free from illumination nonuniformity, and an enlarged image of the specimen is formed on an image plane 3. To prevent occurrence of illumination nonuniformity and insufficiency of the numerical aperture, it is essential to insert a light diffusing plate (frosted plate) at a position I between the second collector lens unit L2 and the first variable stop A.

When the illumination optical system is in the position for an ultra-low magnification (from 0.5× to 1× magnification) as shown in FIG. 5(b), a condenser lens unit LC2 is placed at a position in front of where the second image of the light source 1 is formed by the two intermediate lens units L3 and L4. Condenser lens unit LC2, for ultra-low magnification, has a long focal length and is used in place of the condenser lens unit LC1 for a high or low magnification. In this case, the second image of the light source 1 is formed on the specimen plane 2, and an image of the second variable stop F is formed at infinity. Consequently, a light beam from a point in the aperture of the second variable stop F is incident on the specimen plane 2 in an afocal form. Accordingly, in this case, the first variable stop A is a field stop, and the second variable stop F is an aperture stop. The back focal point of an ultra-low magnification objective Ob2 of the microscope is conjugate to the second variable stop F. The whole illumination optical system acts as a critical illumination system.

In the conventional microscope illumination optical system of Japanese Patent Application Unexamined Publication (KOKAI) No. 9-33820, when it is in the position for an ultra-low magnification, FIG. 5(b), the specimen plane 2 and the light source 1 are conjugate to each other as stated above. Therefore, if a light diffusing plate (frosted plate) is not placed in the optical path from the light source 1 to the specimen plane 2, the image of the light source 1 is superimposed on the specimen. Consequently, an undesirable filament image is seen. However, if a light diffusing plate is inserted at position I between the second collector lens unit L2 and the first intermediate lens unit L3, an image of the light diffusing plate is formed near the specimen plane 2. This is because the distance between the position I and the first variable stop A is short. Consequently, the roughness of the light diffusing plate is undesirably seen. In particular, when the aperture of the second variable stop F is reduced, the depth of focus deepens, and the roughness of the light diffusing plate becomes even more conspicuous. Therefore, the conventional illumination optical system becomes impractical.

Accordingly, it is necessary to blur the filament image by placing a light diffusing plate at a position II in or near the condenser lens unit LC2 for an ultra-low magnification. However, because position II is between the second variable stop F and the specimen plane 2, images of both the first variable stop A (field stop) and the second variable stop F (aperture stop) are blurred undesirably if a light diffusing plate is placed at the position II. Consequently, the visual field is not well defined, and the second variable stop F fails to function as an aperture stop. In ultra-low magnification observation with microscopes in particular, specimens of weak contrast are often made visible by reducing the aperture of the aperture stop to thereby create an under-numerical aperture condition. In this regard, if the second variable stop F cannot serve as an aperture stop, it becomes impossible to observe various images by adjusting the numerical aperture of the illumination system as stated above.

In view of the above-described problems associated with the prior art, the present invention provides a microscope illumination optical system for an ultra-low magnification (from 0.5× to 1× magnification) that has a field stop and an aperture stop. With the present invent even if a light source image is blurred by insertion of a light diffusing plate, the roughness of the light diffusing plate is not visible, and uniform illumination can be performed. In specimens of weak contrast, a phase distribution, can be made visible through adjustment of the numerical aperture by varying the aperture of the aperture stop.

SUMMARY OF THE INVENTION

The present invention provides a microscope illumination optical system including a light source and in order from the light source to a specimen plane: a collector lens system that forms a first image of the light source, a first variable stop placed at a position where the first image is formed, an intermediate lens system having a second variable stop therein and arranged to form an image of the first variable stop behind the intermediate lens system, and a plurality of condenser lens systems of different magnifications that are interchangeably placed between the intermediate lens system and the specimen plane.

Of the condenser lens systems, a condenser lens system having the smallest magnification is arranged such that an image of the second variable stop is formed at a finite position with respect to the specimen plane, and that a position in the microscope illumination optical system that is conjugate to the specimen plane is located closer to the light source or the intermediate lens system than the first variable stop.

In this case, it is desirable that the condenser lens system having the smallest magnification should satisfy the following condition (1):

$$2b < a < 4b \tag{1}$$

where a is the distance from the specimen plane to the finite position, and b is a beam diameter (illumination range) on the specimen plane when the aperture of the second variable stop is reduced.

When any of the condenser lens systems other than the one having the smallest magnification is used, it is desirable that the second variable stop and the specimen plane should be conjugate to each other, and that an image of the first variable stop should be formed at infinity with respect to the specimen plane.

In addition, the present invention provides a microscope illumination optical system having a light source and a collector lens system that collects light from the light source. The microscope illumination optical system further has a condenser lens system that receives light from the collector lens system to illuminate a specimen, and a first variable stop. The condenser lens system includes a plurality of condenser lens systems of different magnifications. When the microscope illumination optical system uses a condenser lens system for a high or low magnification selected from the plurality of condenser lens systems, the position of the first variable stop is conjugate to the light source. Furthermore the position of a second variable stop is conjugate to the specimen. When the microscope illumination optical system uses a condenser lens system for an ultra-low magnification selected from the plurality of condenser lens systems, a light diffusing member is placed near the light source side of the second variable stop.

In this case, it is desirable that the condenser lens system for an ultra-low magnification should be used in combination with an ultra-low magnification objective, so that the pupil position of the ultra-low magnification objective is conjugate to the second variable stop. It is also desirable to satisfy the following condition (2):

$$d/D \leq 0.5 \tag{2}$$

where D is the pupil diameter of the ultra-low magnification objective, and d is the smallest aperture of the second variable stop at the pupil position of the ultra-low magnification objective.

In the illumination optical system, it is desirable that the first variable stop should be placed at the front focal point of the condenser lens system for a high or low magnification. The second variable stop should be placed at a position in the collector lens system that is conjugate to a plane where the specimen is placed.

In addition, it is desirable that the illumination optical system should further have an intermediate lens system. The first variable stop should be placed at the front focal point of the condenser lens system for a high or low magnification or at a point conjugate to the front focal point. Furthermore, that the second variable stop should be placed at a position in the intermediate lens system that is conjugate to the specimen plane.

The present invention includes a microscope having either of the above-described microscope illumination optical systems as an illumination optical system. In this case, it is desirable that the microscope illumination optical system should be a transmissive illumination optical system.

In the present invention, a condenser lens system having the smallest magnification of a plurality of condenser lens systems is arranged such that an image of the second variable stop is formed at a finite position with respect to the specimen plane. A position in the microscope illumination optical system that is conjugate to the specimen plane is located closer to the light source or the intermediate lens system than the first variable stop. Therefore, in a case where the position conjugate to the specimen plane is located closer to the light source than the first variable stop, a light diffusing plate is placed near a lens of the intermediate lens system closest to the light source away from the first variable stop. This is done to prevent a light source image from being seen superimposed on the specimen. In a case where the position conjugate to the specimen plane is located closer to the intermediate lens system than the first variable stop, a light diffusing plate is placed near a lens of the collector lens system closest to the specimen plane. By doing so, the light source image is blurred and thus made invisible, and the roughness of the light diffusing plate is also made invisible. Thus, uniform illumination can be realized. Moreover, because the light diffusing plate is placed closer to the light source than the second variable stop, there is no possibility of the second variable stop failing to function as an aperture stop. Thus, specimens of weak contrast, a phase distribution, etc. can be made visible through adjustment of the numerical aperture by controlling the second variable stop.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The microscope illumination optical system according to the present invention will be described below.

Figure 5A:
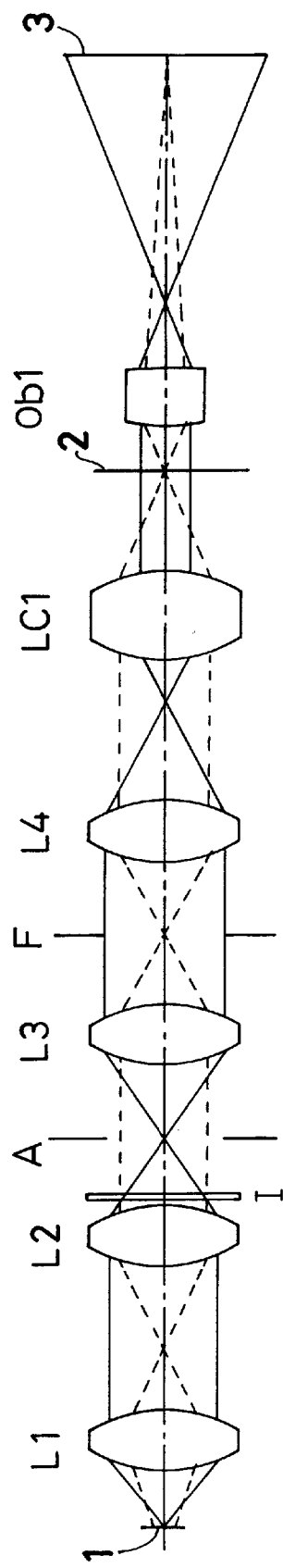
FIG. 5(a) shows an arrangement of a conventional microscope illumination optical system, illustrating an optical ray trace of the arrangement when a condenser for a high or low magnification is used.
Figure 5B:
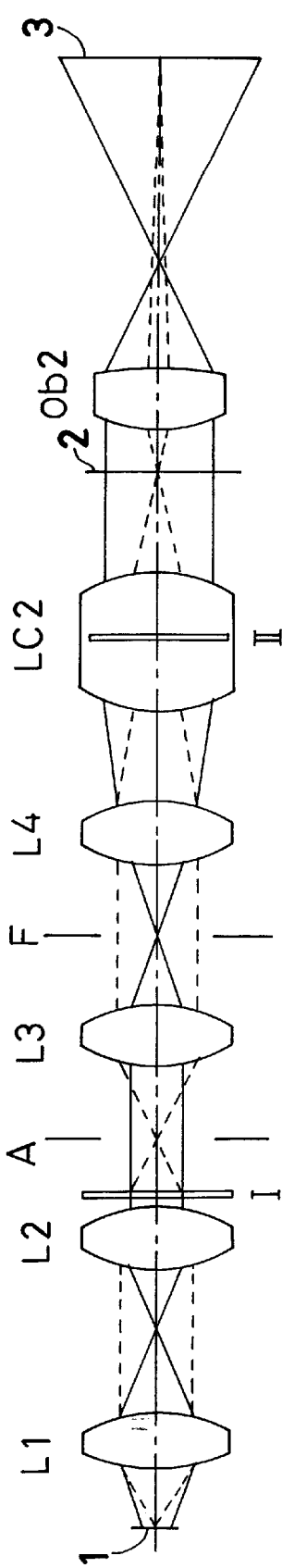
FIG. 5(b) shows an arrangement of a conventional microscope illumination optical system, illustrating an optical ray trace of the arrangement when a condenser for an ultra-low magnification is used.

The basic principle of the present invention is as follows. According to the conventional microscope illumination optical system proposed in Japanese Patent Application Unexamined Publication (KOKAI) No. 9-33820, when the optical system is set in the position for an ultra-low magnification as shown in FIG. 5(b) a light beam from a point in the aperture of the second variable stop F is incident on the specimen plane 2 in an afocal form. In other words, the light beam forms an image of the second variable stop F at infinity in the space of the specimen plane 2. In contrast, the microscope illumination optical system according to the present invention is arranged to form an image of the second variable stop F at a finite position in the space of the specimen plane 2. By changing the condenser lens unit LC2 for an ultra-low magnification so as to meet the requirements of the present invention, a position in the illumination optical system that is conjugate to the specimen plane 2 can be moved closer to the light source 1. Consequently, a light diffusing plate can be placed not at a position between the second variable stop F and the specimen plane 2 but at a position closer to the light source 1 than the second variable stop F where the roughness of the light diffusing plate is invisible. Accordingly, at an ultra-low magnification (e.g. from 0.5× to 1× magnification), it is possible to perform uniform illumination free from the problem that the light source image is undesirably seen as in the prior art, and it becomes possible to make specimens of weak contrast, a phase distribution, etc. visible through adjustment of the numerical aperture by controlling the second variable stop F, which is an aperture stop.

An embodiment of the microscope illumination optical system according to the present invention will be described below (the following description of the present invention overlaps the description of the prior art).

Figure 1A:
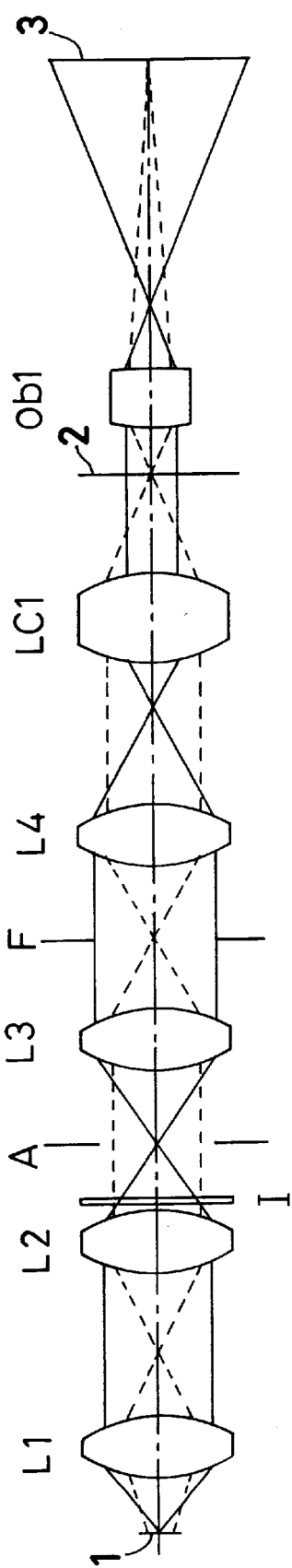
FIG. 1(a) shows an arrangement of the microscope illumination optical system according to an embodiment of the present invention, including an objective, illustrating an optical ray trace of the arrangement when a condenser for a high or low magnification is used.
Figure 1B:
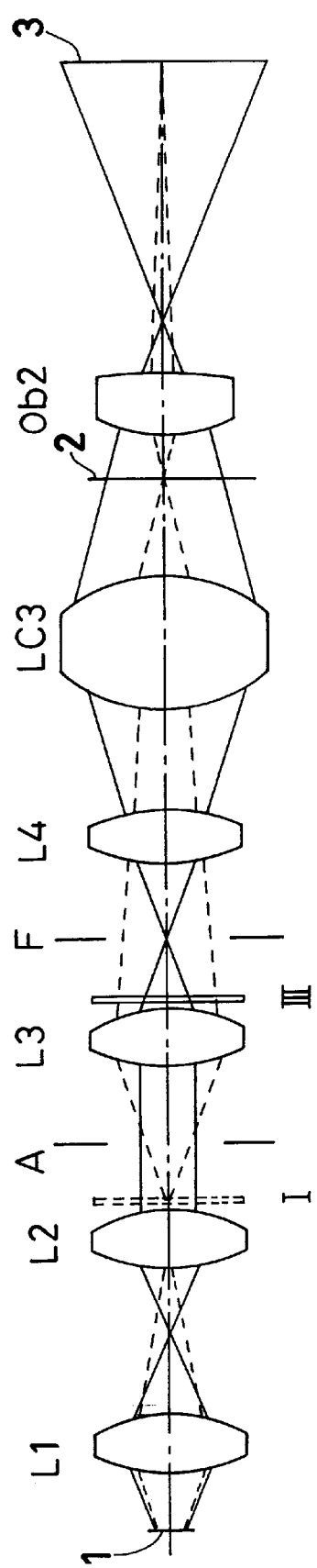
FIG. 1(b) shows an arrangement of the microscope illumination optical system according to an embodiment of the present invention, including an objective, illustrating an optical ray trace of the arrangement when a condenser for an ultra-low magnification is used.
Figure 2A:
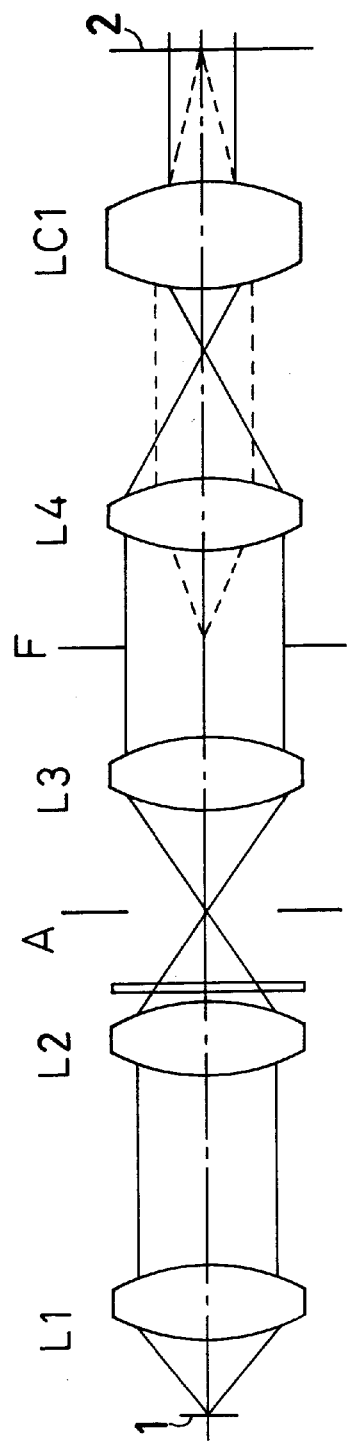
FIG. 2(a) shows an arrangement of only the microscope illumination optical system in FIG. 1(a) illustrating an optical ray trace of the arrangement when a condenser for a high or low magnification is used.
Figure 2B:
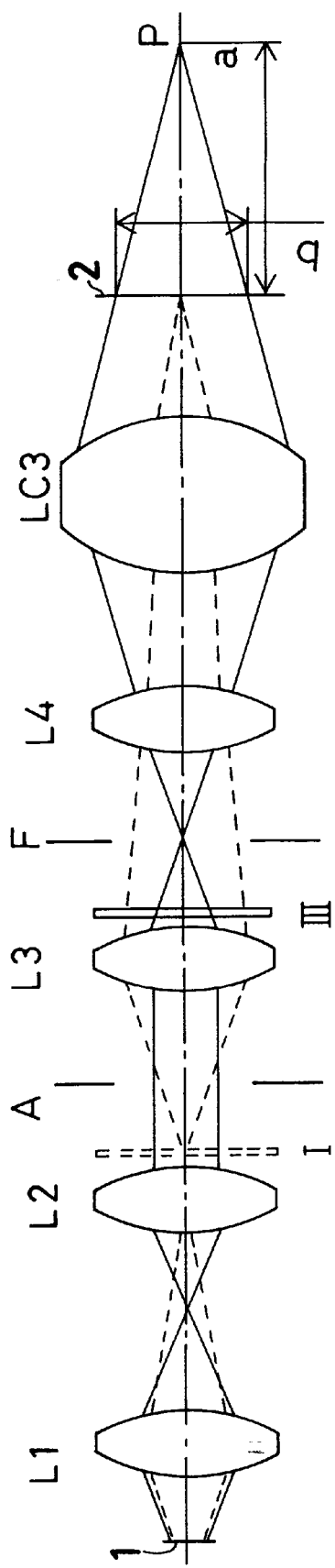
FIG. 2(b) shows an arrangement of only the microscope illumination optical system in FIG. 1(b) illustrating an optical ray trace of the arrangement when a condenser for an ultra-low magnification is used.

FIG. 1(a) illustrates an arrangement of the microscope illumination optical system according to the present invention, including an objective, illustrating an optical ray trace of the arrangement when a condenser for a high or low magnification is used; and FIG. 1(a) illustrates an arrangement of the microscope illumination optical system according to the present invention, including an objective, illustrating an optical ray trace of the arrangement when a condenser for an ultra-low magnification is used. FIG. 2(a) shows an arrangement of only the microscope illumination optical system in FIG. 1(a) illustrates an optical ray trace of the arrangement when a condenser for a high or low magnification is used; and FIG. 2(b) shows an arrangement of only the microscope illumination optical system in FIG. 1(b) illustrates an optical ray trace of the arrangement when a condenser for an ultra-low magnification is used.

FIG. 1(a) and FIG. 2(a) show the optical system as set in the position for a high or low magnification. The arrangement of the optical system is similar to that shown in part (a) of FIG. 5. That is, light from a light source 1 passes through a first collector lens unit L1 and a second collector lens unit L2. The two collector lens units L1 and L2 form a first image of the light source 1. A first variable stop A is placed at the position of the first image. A light beam passing through the first variable stop A passes through a first intermediate lens unit L3, a second variable stop F and a second intermediate lens unit L4. The two intermediate lens units L3 and L4 form a second image of the light source 1. Accordingly, the position of the image plane of the second image is conjugate to the first variable stop A with respect to the two intermediate lens units L3 and L4. The second variable stop F is placed at the front focal point of the second intermediate lens unit L4. A condenser lens unit LC1 for a high or low magnification is placed behind the second intermediate lens unit L4 to lead a light beam from the second image of the light source 1 to a specimen plane 2 in the form of collimated light. The specimen plane 2 is conjugate to the second variable stop F with respect to the second intermediate lens unit L4 and the condenser lens unit LC1 for a high or low magnification.

Accordingly, when the illumination optical system is in the position for a high or low magnification (e.g. from 4× to 100× magnification) as shown in FIG. 1(a) and FIG. 2(a) the first variable stop A is an aperture stop, and the second variable stop F is a field stop. The back focal point of a high- or low-magnification objective Ob1 of the microscope is conjugate to the first variable stop A and the light source 1. The whole illumination optical system acts as a Koehler illumination system. A specimen is placed in the specimen plane 2, which is well defined, bright and free from illumination nonuniformity, and an enlarged image of the specimen is formed on an image plane 3. To prevent occurrence of illumination nonuniformity and insufficiency of the numerical aperture, a light diffusing plate (frosted plate) is inserted at a position I between the second collector lens unit L2 and the first intermediate lens unit L3.

FIG. 1(a) and FIG. 2(a) show the arrangement of the optical system as set in the position for an ultra-low magnification (e.g. from 0.5× to 1× magnification) according to the present invention. In place of the condenser lens unit LC1 for a high or low magnification, a condenser lens unit LC3 for an ultra-low magnification is placed so as to form an image of the second variable stop F not at infinity but at a finite position P [see FIG. 2(b)] in the space of the specimen plane 2. In this embodiment, a condenser lens unit having a focal length nearly equal to that of the conventional condenser lens unit LC2 for an ultra-low magnification is used as the condenser lens unit LC3 for an ultra-low magnification, and the object distance is slightly lengthened with the condenser lens unit LC3, thereby allowing an image of the second variable stop F to be formed at the finite position P in the objective-side space across the specimen plane 2 as stated above. It should be noted that the finite position P is the entrance pupil position of the objective.

The use of the condenser lens unit LC3 for an ultra-low magnification causes the position in the illumination optical system that is conjugate to the specimen plane 2 to move to the vicinity of a position I closer to the light source 1 than the first variable stop A (when a condenser lens unit having a focal length shorter than that of the condenser lens unit LC2 for an ultra-low magnification is used as the condenser lens unit LC3 for an ultra-low magnification, the conjugate position moves closer to the first intermediate lens unit L3 than the first variable stop A).

Accordingly, when the microscope illumination optical system according to the present invention is in the position for an ultra-low magnification, the second variable stop F acts as an aperture stop, although the first variable stop A is not a field stop in the strict sense of the term. However, this is not a problem because in the illumination optical system for an ultra-low magnification the aperture stop is important as compared to the field stop. It should be noted that neither the light source 1 nor the second variable stop F is imaged at the back focal point of the ultra-low magnification objective Ob2 of the microscope. Therefore, the whole microscope illumination optical system does not act as a critical illumination system or a Koehler illumination system.

When the illumination optical system is in the position shown in FIGS. 1(b) and 2(b), the position in the illumination optical system that is conjugate to the specimen plane 2 has moved to the vicinity of the position I closer to the light source 1 than the first variable stop A as stated above. In this case, it is conceivable to insert a light diffusing plate at the position I close to the second collector lens unit L2 to prevent an image of the light source 1 from being seen superimposed on the specimen (in the illustrated arrangement, the light source 1 and the specimen plane 2 are not conjugate to each other, but when the depth of focus is deepened by reducing the aperture of the second variable stop F, a light source image is undesirably seen). However, if a light diffusing plate is inserted at the position I, the roughness of the light diffusing plate is undesirably seen. On the other hand, a position III near the first intermediate lens unit L3 is shifted from the position conjugate to the specimen plane 2 to a considerable extent (more than double in comparison to the prior art). Therefore, if a light diffusing plate is placed at the position III, the light source image is blurred and thus made invisible, and the roughness of the light diffusing plate is also invisible. Thus, it becomes possible to realize uniform illumination. Moreover, because the light diffusing plate is placed closer to the light source 1 than the second variable stop F, the second variable stop F can function as an aperture stop satisfactorily. Thus, specimens of weak contrast, a phase distribution, etc. can be made visible through adjustment of the numerical aperture by controlling the second variable stop F.

In FIG. 2(b), it is desirable to arrange the condenser lens unit LC3 for an ultra-low magnification so as to satisfy the following condition (1):

$$2b < a < 4b \tag{1}$$

where a is the distance from the specimen plane 2 to the image position P of the second variable stop F in the space of the specimen plane 2, and b is a beam diameter (illumination range) on the specimen plane 2 when the aperture of the second variable stop F is reduced.

If the distance a is not smaller than the upper limit of the condition (1), i.e. 4b, the distance by which the conjugate position to the specimen plane 2 is shifted from the first variable stop A becomes insufficient. As a result, the illumination optical system becomes close to the conventional optical system FIG. 5(b) disclosed in Japanese Patent Application Unexamined Publication (KOKAI) No. 9-33820. Consequently, specimens of weak contrast, a phase distribution; cannot be made visible even if the aperture of the second variable stop F is reduced. Conversely, if the distance a is not greater than the lower limit, i.e. 2b, the outer diameter of the condenser lens unit LC3 for an ultra-low magnification becomes excessively large, resulting in an impractical structure.

Incidentally, the embodiment shown in FIGS. 1 and 2 uses the condenser lens unit LC3 Condenser lens unit LC3 for an ultra-low magnification a condenser lens unit has a focal length nearly equal to that of the conventional condenser lens unit LC2 for an ultra-low magnification. That causes the object distance to increase slightly so that the position in the illumination optical system, conjugate to the specimen plane 2, moves to the vicinity of the position I, closer to the light source 1 than variable stop A. However, it is also possible to use a condenser lens unit having a focal length shorter than that of the conventional condenser lens unit LC2 for an ultra-low magnification, so that the position in the illumination optical system that is conjugate to the specimen plane 2 moves closer to the first intermediate lens unit L3 than the first variable stop A. In this case, a light diffusing plate for blurring the light source image on the specimen plane 2 is placed at the position I near the second collector lens unit L2.

As has been stated above, a condenser lens system for an ultra-low magnification is used in combination with an ultra-low magnification objective. In this case, the pupil position of the ultra-low magnification objective and the second variable stop F are placed in conjugate relation to each other by the combination of the condenser lens system for an ultra-low magnification and the ultra-low magnification objective.

Figure 3:
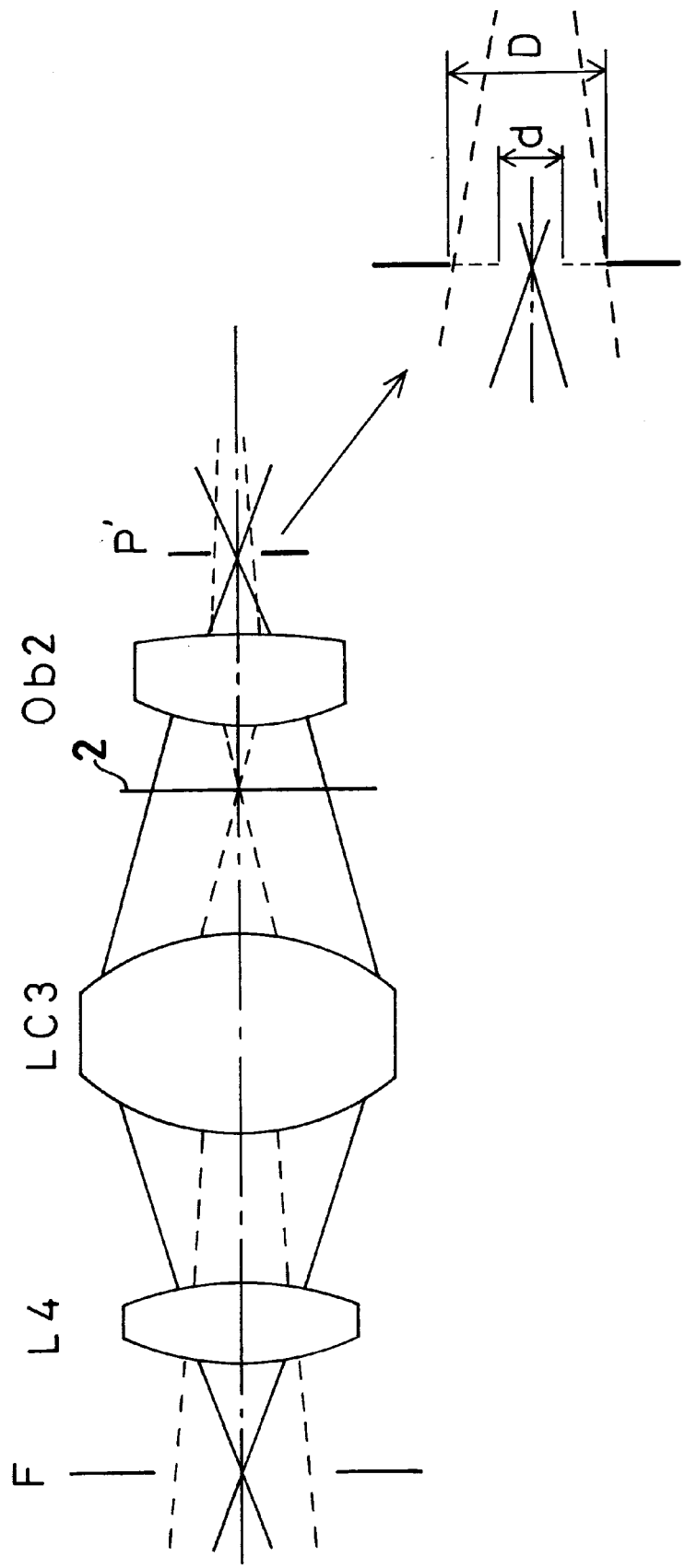
FIG. 3 is a diagram for describing the relationship between the pupil diameter of an ultra-low magnification objective and the smallest aperture of a second variable stop at the pupil position of the ultra-low magnification objective.

In this case, it is desirable to satisfy the following condition (2):

$$d/D \leq 0.5 \tag{2}$$

where, as shown in FIG. 3, D is the pupil diameter of the ultra-low magnification objective, and d is the smallest aperture of the second variable stop F at the pupil position of the ultra-low magnification objective (i.e. the image of the second variable stop F projected onto the pupil position of the objective).

If d/D exceeds the upper limit of the condition (2), i.e. 0.5, that is, if the aperture of the second variable stop F is excessively large, it is impossible to obtain a satisfactorily high contrast in the case of observing a specimen of weak contrast or a phase specimen. Accordingly, a transparent specimen or a specimen of weak contrast cannot favorably be observed even if an illumination optical system is specially designed so that the light diffusing plate or the light source image is not seen superimposed on the specimen.

It is preferable to satisfy the following condition (2)':

$$0.1 \leq d/D \leq 0.5 \tag{2'}$$

Figure 4A:
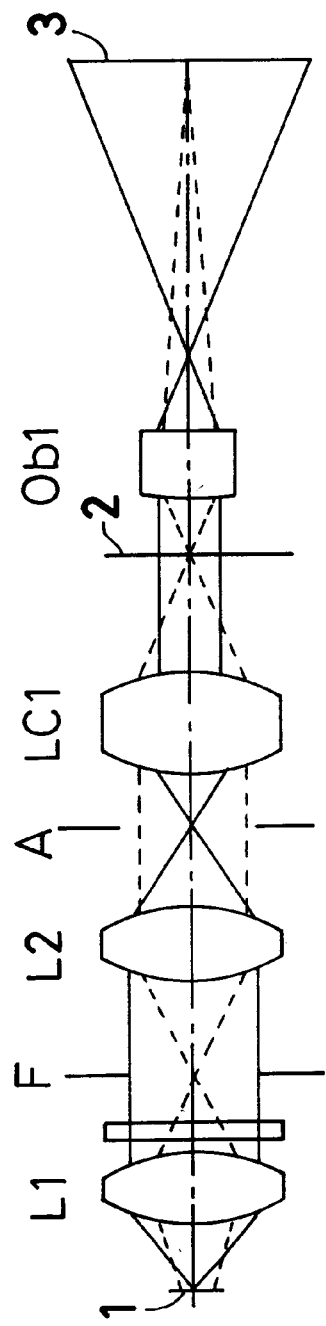
FIG. 4(a) shows another arrangement of the microscope illumination optical system according to an embodiment of the present invention, including an objective, illustrating an optical ray trace of the arrangement when a condenser for a high or low magnification is used.
Figure 4B:
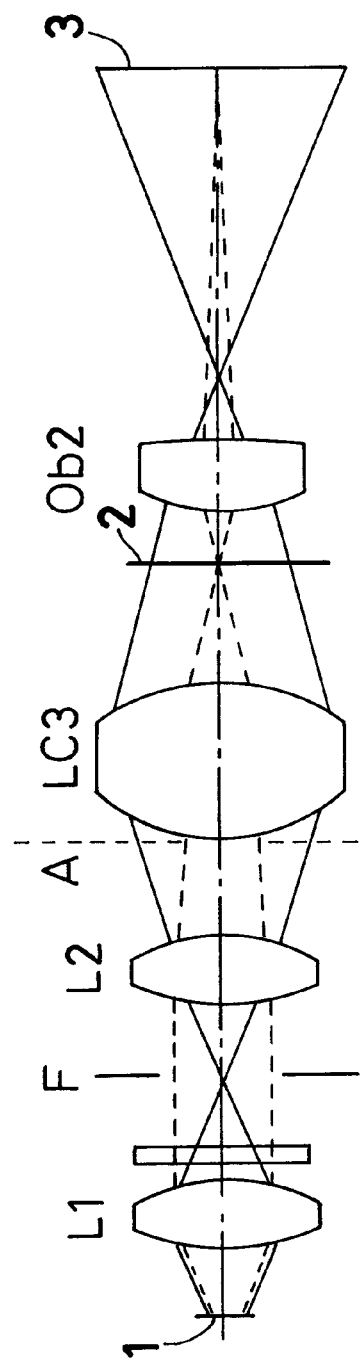
FIG. 4(b) shows another arrangement of the microscope illumination optical system according to an embodiment of the present invention, including an objective, illustrating an optical ray trace of the arrangement when a condenser for an ultra-low magnification is used.

FIGS. 4(a) and 4(b) are diagrams a diagram showing another microscope illumination optical system according to the present invention. The microscope illumination optical system shown in FIGS. 4(a) and 4(b) are a simplified illumination optical system, which is arranged in the same way as the illumination optical system shown in FIGS. 1(a) and 1(b) except that the first intermediate lens unit L3 and the second intermediate lens unit L4 are omitted.

FIG. 4(a) shows the illumination optical system when a condenser lens unit LC1 for a high or low magnification is used. Light from a light source 1 passes through a first collector lens unit L1 and a second collector lens unit L2. The two collector lens units L1 and L2 form a first image of the light source 1. The position where the first image is formed is coincident with the front focal point of the condenser lens unit Lc1. A first variable stop A is placed at the position of the first image.

A second variable stop F is placed at a position between the first collector lens unit L1 and the second collector lens unit L2 that is conjugate to the specimen plane 2. Accordingly, in the arrangement shown in part (a) of FIG. 4, the first variable stop A functions as an aperture stop, and the second variable stop F as a field stop. It should be noted that a light diffusing plate should be placed at a position between the second variable stop F and the first collector lens unit L1 near the first collector lens unit L1.

FIG. 4(b) shows the illumination optical system when a condenser lens unit LC3 for an ultra-low magnification based on the present invention is used. In this case, the condenser lens unit LC3 for an ultra-low magnification operates so that an image of the second variable stop F is formed at a finite position P [see FIG. 2(b)] in the objective-side space across the specimen plane 2 as in the case of FIG. 2(b). Consequently, the second variable stop F, which functions as a field stop in the arrangement shown in FIG. 4(a), functions as an aperture stop when the condenser lens unit LC3 for an ultra-low magnification is used. It should be noted that the first variable stop A in FIG. 4(a), which functions as an aperture stop, moves out of the illumination light path together with the condenser lens unit Lc1 for a high or low magnification as the condenser lens unit LC3 for an ultra-low magnification moves into the illumination light path.

Although the microscope illumination optical system according to the present invention has been described above by way of embodiments, the present invention is not limited to the foregoing embodiments but can be modified in a variety of ways. It should be noted that in the present invention the switching between a plurality of condenser lens units, i.e. a condenser lens unit for a high magnification, a condenser lens unit for a low magnification, and a condenser lens unit for an ultra-low magnification, may be performed by using any method or mechanism.

As will be clear from the foregoing description, the microscope illumination optical system and the microscope having the illumination optical system according to the present invention have a plurality of condenser lens systems, and a condenser lens system having the smallest magnification of the plurality of condenser lens systems is arranged such that an image of the second variable stop is formed at a finite position with respect to the specimen plane, and that a position in the microscope illumination optical system that is conjugate to the specimen plane is located closer to the light source or the intermediate lens system than the first variable stop. Therefore, in a case where the position conjugate to the specimen plane is located closer to the light source than the first variable stop, a light diffusing plate is placed near a lens of the intermediate lens system closest to the light source away from the first variable stop, to prevent a light source image from being seen superimposed on the specimen. In a case where the position conjugate to the specimen plane is located closer to the intermediate lens system than the first variable stop, a light diffusing plate is placed near a lens of the collector lens system closest to the specimen plane. By doing so, the light source image is blurred and thus made invisible, and the roughness of the light diffusing plate is also made invisible. Thus, uniform illumination can be realized. Moreover, because the light diffusing plate is placed closer to the light source than the second variable stop, there is no possibility of the second variable stop failing to function as an aperture stop. Thus, specimens of weak contrast, a phase distribution, etc. can be made visible through adjustment of the numerical aperture by controlling the second variable stop.

What we claim is:

1. A microscope illumination optical system comprising:

a light source; and, in order from said light source to a specimen plane:

a collector lens system that forms a first image of said light source, a first variable stop placed at a position where said first image is formed, an intermediate lens system having a second variable stop therein and arranged to form an image of said first variable stop behind said intermediate lens system, and a plurality of condenser lens systems of different magnifications that are interchangeably placed between said intermediate lens system and said specimen plane, wherein, of said condenser lens systems, a condenser lens system having a smallest magnification is placed closer to said specimen plane than a position where said microscope illumination optical system forms a critical illumination optical system, so that an image of said second variable stop is formed at a finite position with respect to said specimen plane, and an image of said specimen plane is located closer to said light source than said first variable stop.

2. A microscope illumination optical system comprising:

a light source;

a collector lens system that collects light from said light source;

a condenser lens system that receives light from said collector lens system to illuminate a specimen; and a first variable stop;

wherein said condenser lens system includes a plurality of condenser lens systems of different magnifications, and wherein when said microscope illumination optical system uses a condenser lens system for a high or low magnification selected from said plurality of condenser lens systems, said first variable stop is conjugate to said light source, and a second variable stop is conjugate to said specimen, and when said microscope illumination optical system uses a condenser lens system for an ultra-low magnification selected from said plurality of condenser lens systems, a light diffusing member is placed near a light source side of said second variable stop.

3. A microscope illumination optical system according to claim 1, wherein when any of said condenser lens systems other than said condenser lens system having a smallest magnification is used, said second variable stop and said specimen plane are conjugate to each other, and an image of said first variable stop is formed at infinity with respect to said specimen plane.

4. A microscope having the microscope illumination optical system of claim 1 or 2 as an illumination optical system.

5. A microscope illumination optical system according to claim 2, wherein said first variable stop is placed at a front focal point of said condenser lens system for a high or low magnification, and said second variable stop is placed at a position in said collector lens system that is conjugate to a plane where said specimen is placed.

6. A microscope illumination optical system according to claim 2, further comprising an intermediate lens system, wherein said first variable stop is placed at a front focal point of said condenser lens system for a high or low magnification or at a point conjugate to said front focal point, and said second variable stop is placed at a position in said intermediate lens system that is conjugate to a plane where said specimen is placed.

* * * * *